(12) United States Patent
Iben (10) Patent No.: US 7,538,986 B2
(45) Date of Patent: May 26, 2009

(54) MULTI-PORT CABLE FOR REMOVABLE ESD/EOD PROTECTION FOR ELECTRONIC DEVICES

(75) Inventor: Icko E. (Tim) Iben, Santa Clara, CA (US)

(73) Assignee: International Business Machines Corporation, Armonk, NY (US)

(*) Notice: Subject to any disclaimer, the term of this patent is extended or adjusted under 35 U.S.C. 154(b) by 784 days.

(21) Appl. No.: 10/986,263

(22) Filed: Nov. 10, 2004

(65) Prior Publication Data

US 2006/0098351 A1    May 11, 2006

(51) Int. Cl.
*G11B 5/33* (2006.01)
(52) U.S. Cl. ...................................... 360/323
(58) Field of Classification Search .................. 360/323
See application file for complete search history.

(56) References Cited

U.S. PATENT DOCUMENTS

| | | | | |
|---|---|---|---|---|
| 5,644,454 | A | * 7/1997 | Arya et al. | 360/245.8 |
| 6,507,467 | B1 | * 1/2003 | Schadewald et al. | 360/323 |
| 6,574,078 | B1 | 6/2003 | Voldman | 360/323 |
| 6,956,722 | B2 | 10/2005 | Wada et al. | 360/245.8 |
| 7,327,042 | B2 | 2/2008 | Ohazama | 257/786 |
| 2002/0044392 | A1 | 4/2002 | Bougtaghou et al. | 360/323 |
| 2003/0151858 | A1 | 8/2003 | Hsiao et al. | 360/323 |
| 2003/0174445 | A1 | 9/2003 | Luo | 360/245.9 |

FOREIGN PATENT DOCUMENTS

| | | |
|---|---|---|
| CN | 02142438.1 | 4/2003 |
| CN | 200310119406.3 | 6/2004 |
| JP | 8315321 A | 11/1996 |
| JP | 11045423 A | 2/1999 |
| JP | 11242809 A | 9/1999 |
| JP | 2000195023 A * | 7/2000 |
| JP | 2000315303 | 11/2000 |
| JP | 2001060309 A | 3/2001 |
| JP | 2002050013 A | 2/2002 |

* cited by examiner

*Primary Examiner*—David D Davis
(74) *Attorney, Agent, or Firm*—Zilka-Kotab, PC (57) ABSTRACT

A protective device for protecting an electronic device, e.g., MR head, from ESD/EOS damage includes a cable having leads coupled to the electronic device and a first port providing access to the leads. A second port with one-to-one electrical connection to each lead in the cable provides a second electrical access to the all leads. A shorting device is coupled to one of the ports thereby creating a short between both the leads of the extension and the leads of the cable. The other port is available for coupling to an external device, e.g., tester or end device while the short provides ESD/EOS protection.

24 Claims, 10 Drawing Sheets

MULTI-PORT CABLE FOR REMOVABLE ESD/EOD PROTECTION FOR ELECTRONIC DEVICES

FIELD OF THE INVENTION

The present invention relates to a device for protection from electrostatic discharge and electrical overstress, and more particularly, this invention relates to using a cable having multiple ports including a shortable port for protecting an electronic device from electrostatic discharge and electrical overstress.

BACKGROUND OF THE INVENTION

Magnetic head-based systems have been widely accepted in the computer industry as a cost-effective form of data storage. In a magnetic tape drive system, a magnetic tape containing a multiplicity of laterally positioned data tracks that extend along the length of the tape is drawn across a magnetic read/write transducer, referred to as a magnetic tape head. The magnetic tape heads can record and read data along the length of the magnetic tape surface as relative movement occurs between the heads and the tape. Because magnetic tape is a flexible media, its lateral position fluctuates as the tape is pulled at high speeds across the tape head. In order to maintain alignment of the read sensors or writing transducers along the tracks, the tape head is moved (actuated) laterally to follow the tape fluctuations as the high speed lateral response, termed actuation, is better achieved with lighter tape heads.

In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk on a spring-loaded support arm known as the actuator arm. As the magnetic disk rotates at operating speed, the moving air generated by the rotating disk in conjunction with the physical design of the slider lifts the magnetic head, allowing it to glide or "fly" slightly above and over the disk surface on a cushion of air, referred to as an air bearing. The flying height of the magnetic head over the disk surface is typically only a few tens of nanometers or less and is primarily a function of disk rotation, the aerodynamic properties of the slider assembly and the force exerted by the spring-loaded actuator arm.

Magnetoresistive (MR) sensors are particularly useful as read elements in magnetic heads, used in the data storage industry for high data recording densities. Two examples of MR materials used in the storage industry are anisotropic magnetoresistive (AMR) and giant magnetoresistive (GMR). MR and GMR sensors are deposited as small and thin multi-layered sheet resistors on a structural substrate. The sheet resistors can be coupled to external devices by contact to metal pads which are electrically connected to the sheet resistors. MR sensors provide a high output signal which is not directly related to the head velocity as in the case of inductive read heads.

To achieve the high areal densities required by the data storage industry, the sensors are made with commensurately small dimensions. The smaller the dimensions, the more sensitive the thin sheet resistors become to damage from spurious current or voltage spike.

A major problem that is encountered during manufacturing, handling and use of MR sheet resistors as magnetic recording transducers is the buildup of electrostatic charges on the various elements of a head or other objects which come into contact with the sensors, particularly sensors of the thin film type, and the accompanying spurious discharge of the static electricity thus generated. Static charges may be externally produced and accumulate on instruments used by persons performing head manufacturing or testing function. These static charges may be discharged through the head causing excessive heating of the sensitive sensors which result in physical or magnetic damage to the sensors.

As described above, when a head is exposed to voltage or current inputs which are larger than that intended under normal operating conditions, the sensor and other parts of the head may be damaged. This sensitivity to electrical damage is particularly severe for MR read sensors because of their relatively small physical size. For example, an MR sensor used for high recording densities for magnetic tape media (order of 25 Mbytes/cm$^2$) are patterned as resistive sheets of MR and accompanying materials, and will have a combined thickness for the sensor sheets on the order of 500 Angstroms (Å) with a width of 1 to 10 microns ($\mu$m) and a height on the order of 1 $\mu$m. Sensors used in extant disk drives are even smaller. Discharge currents of tens of milliamps through such a small resistor can cause severe damage or complete destruction of the MR sensor. The nature of the damage which may be experienced by an MR sensor varies significantly, including complete destruction of the sensor via melting and evaporation, oxidation of materials at the air bearing surface (ABS), generation of shorts via electrical breakdown, and milder forms of magnetic or physical damage in which the head performance may be degraded. Short time current or voltage pulses which cause extensive physical damage to a sensor are termed electrostatic discharge (ESD) pulses. Short time pulses which do not result in noticeable physical damage (resistance changes), but which alter the magnetic response or stability of the sensors due to excessive heating are termed electrical overstress (EOS) pulses.

While a disk head is comprised of a single MR element, modem tape heads have multiple MR elements, on the order of 8 to 32, or even more, all of which must be fully functional. The large number of MR sensors in a tape drive and the requirement that all are functional, makes ESD loss due to a single element very expensive as the entire head must then be scrapped. Testing during manufacturing is important in order to eliminate damaged components early in the process to minimize cost by avoiding processing of damaged parts.

Prior solutions to ESD and EOS protection can be summarized into two types of approaches: (1) one time permanent shorting devices, and (2) multi-use removable shorting devices.

The one time permanent shorting devices include:

(1a) fabricating diodes on the wafer to short out high currents across the sensor;

(1b) depositing a shorting element (e.g., metal) across the sensor which can be later removed at final assembly; and (1c) diodes connecting the two sensor leads together which are permanently mounted in the cable.

The Multi-use removable shorting devices include:

(2a) a removable shorting element which can short out the two leads of the sensor; and (2b) removable diodes which can short out the two leads of the sensor when subjected to high currents.

The problem with (1a)-(1c) is the cost of the permanent solution. (1b) prohibits measuring the properties of the MR sensor until it is in the final device and a large amount of cost has gone into fabrication and assembly. The problem with (2a) is that the device can not be tested during assembly without removing the short and subjecting the sensors to the potential of EOS/ESD damage. The problem with (2b) is the substantial cost of the diodes.

A need therefore exists for providing ESD and EOS protection for a multiplicity of read and/or write head assemblies which has a low cost, is small enough not to affect the dynamics of the head during operation, which fits into the tight spaces within a tape or disk drive, and which allows for the higher voltages used in normal tape drive operation.

SUMMARY OF THE INVENTION

The present invention provides a mechanism for protecting an electronic device, e.g., MR elements, from ESD/EOS damage. The protective device includes a cable having leads coupled to the electronic device and a first port providing access to the leads. An extension has leads electrically coupled to the leads of the cable and a second port providing access to the leads of the extension. A shorting device is coupled to one of the ports thereby creating a short between both the leads of the extension and the leads of the cable.

The extension can be an integral part of the cable. For instance, the extension leads can be part of the initial cable fabrication and thus represent very little additional cost.

The leads of the extension can be solder bonded to the leads of the cable. Alternatively, the leads of the extension can be physically coupled to the leads of the cable by a compression fitting. In another alternative, the leads of the extension are coupled to the leads of the cable with an anisotropic conductive film (ACF).

Preferably, the shorting device is detachably coupleable to one of the ports. The shorting device can be a wire mesh or wire sheet. The shorting device can also be an electrically conductive metal sheet. To enhance the protection afforded by the protective device, a grounding can be provided to electrically ground the shorting device. The grounding preferably includes a resistor having a high impedance to slowly dissipate any voltage differential between the cable leads, head, shorting connector, and the testing device.

To further enhance the protection afforded by the protective device, an outer surface of the cable and/or the extension can include an electrostatic dissipative material.

A method for protecting an electronic device from electrostatic discharge (ESD) using the protective device described above includes coupling a shorting device to one of the ports thereby creating a short between both the leads of the extension and the leads of the cable, coupling an external device to another of the ports, and removing the shorting device. When protection is no longer desired, the port not attached to the external device can be physically removed. Alternatively, the port not attached to the external device can be covered or coated with an insulating material to avoid contact to external metal objects.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present description discloses a protective cable and shorting system for protecting components of an electronic device from ESD and EOS damage. Although the invention is described as embodied for use with a magnetic tape storage system, the invention also applies to other electronic devices, including, e.g., magnetic recording systems and applications using a sensor to detect a magnetic field.

Figure 1:
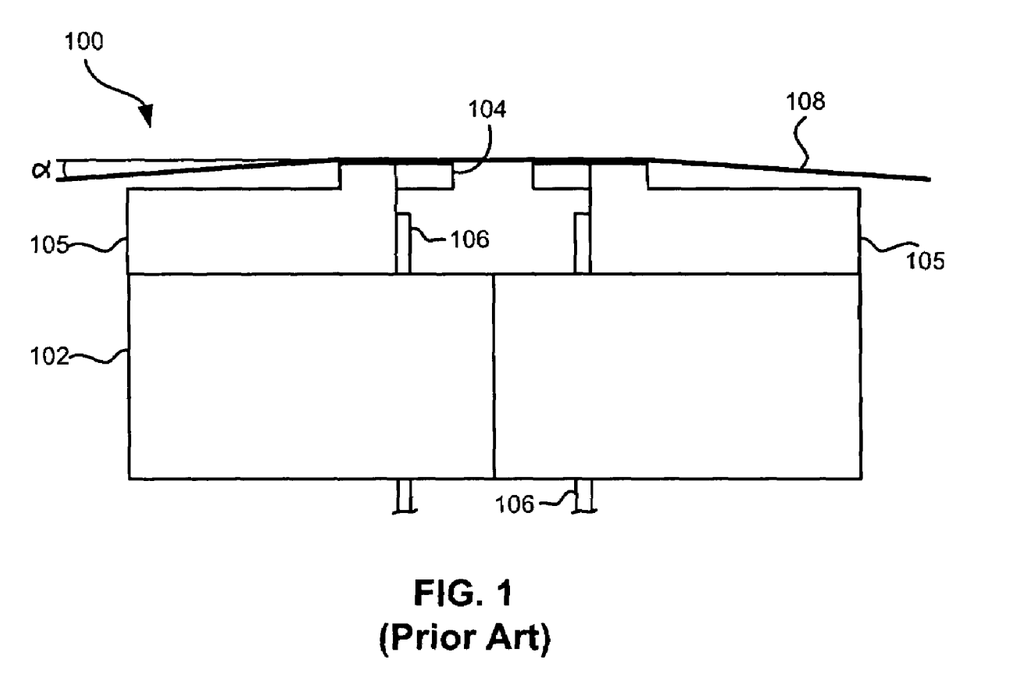
FIG. 1 is a partial side view of a tape head in use.

Prior art FIG. 1 illustrates a tape head in use. As shown, FIG. 1 illustrates a completed head for a read-while-write bidirectional linear tape drive. "Read-while-write" means that the read element follows behind the write element. This arrangement allows the data just written by the write element to be immediately checked for accuracy and true recording by the trailing read element. Specifically, in FIG. 1, a tape head 100 comprising two modules 105 are mounted on a ceramic substrate 102 which are, in turn, adhesively or otherwise physically coupled. Each of the modules 105 includes several read sensors and/or write transducers electrically coupled to pads (not shown) for subsequent attachment to external electronic devices. Closures 104 are coupled to the modules 105 to support the tape and protect the read/write elements from wear by the tape. Conductive wires in cables 106 are fixedly and electrically coupled to the pads. The tape 108 wraps over the modules 105 at a predetermined wrap angle α.

Figure 2:
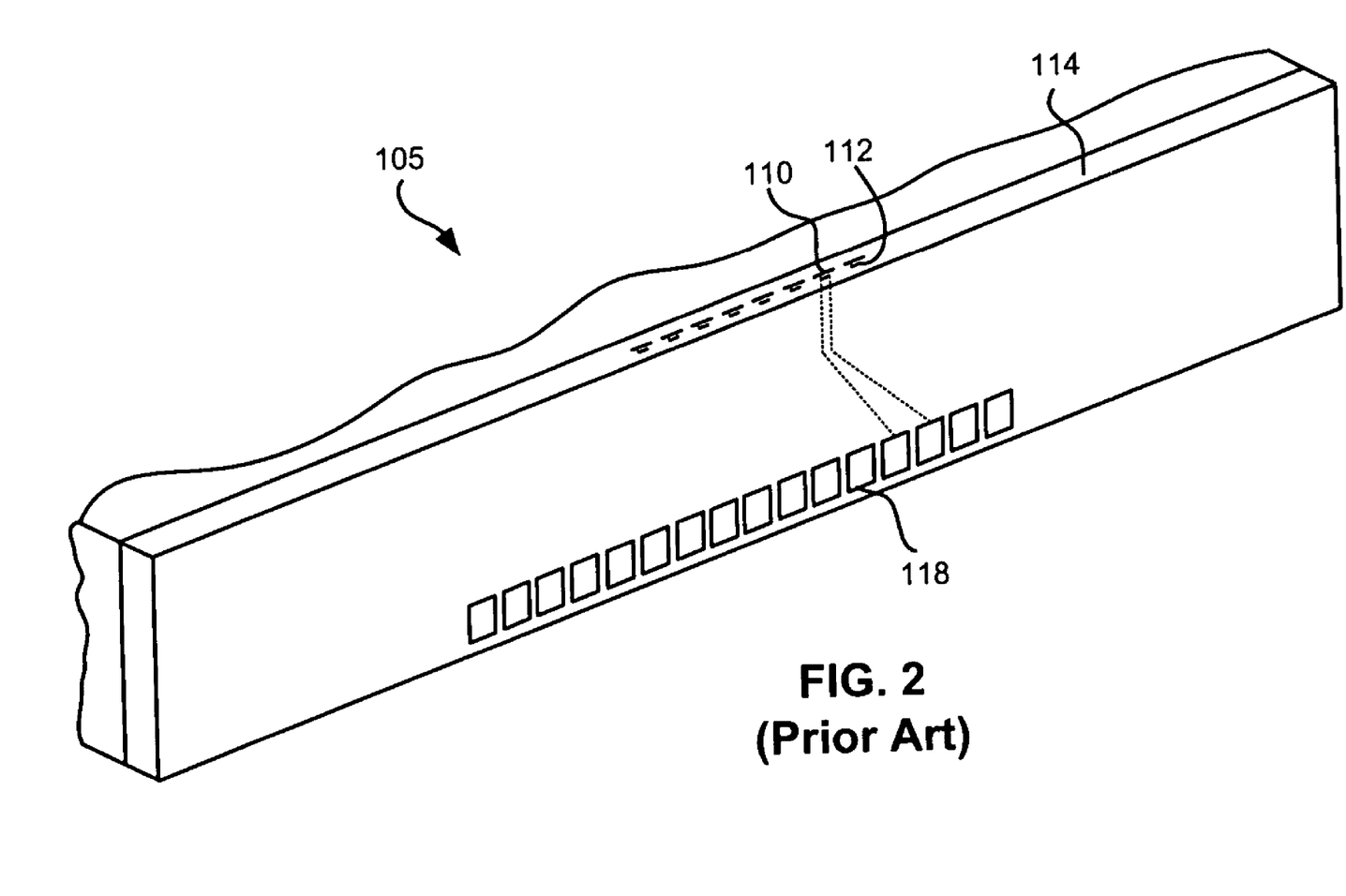
FIG. 2 is a perspective view of a single module of a tape head.

Prior art FIG. 2 illustrates a tape module 105 formed with read and write elements 110, 112 exposed on a tape bearing surface 114 of the module 105. The elements 110, 112 are coupled to pads 118 which are in turn attached to cables 106 prior to installation in a drive.

Figure 3:
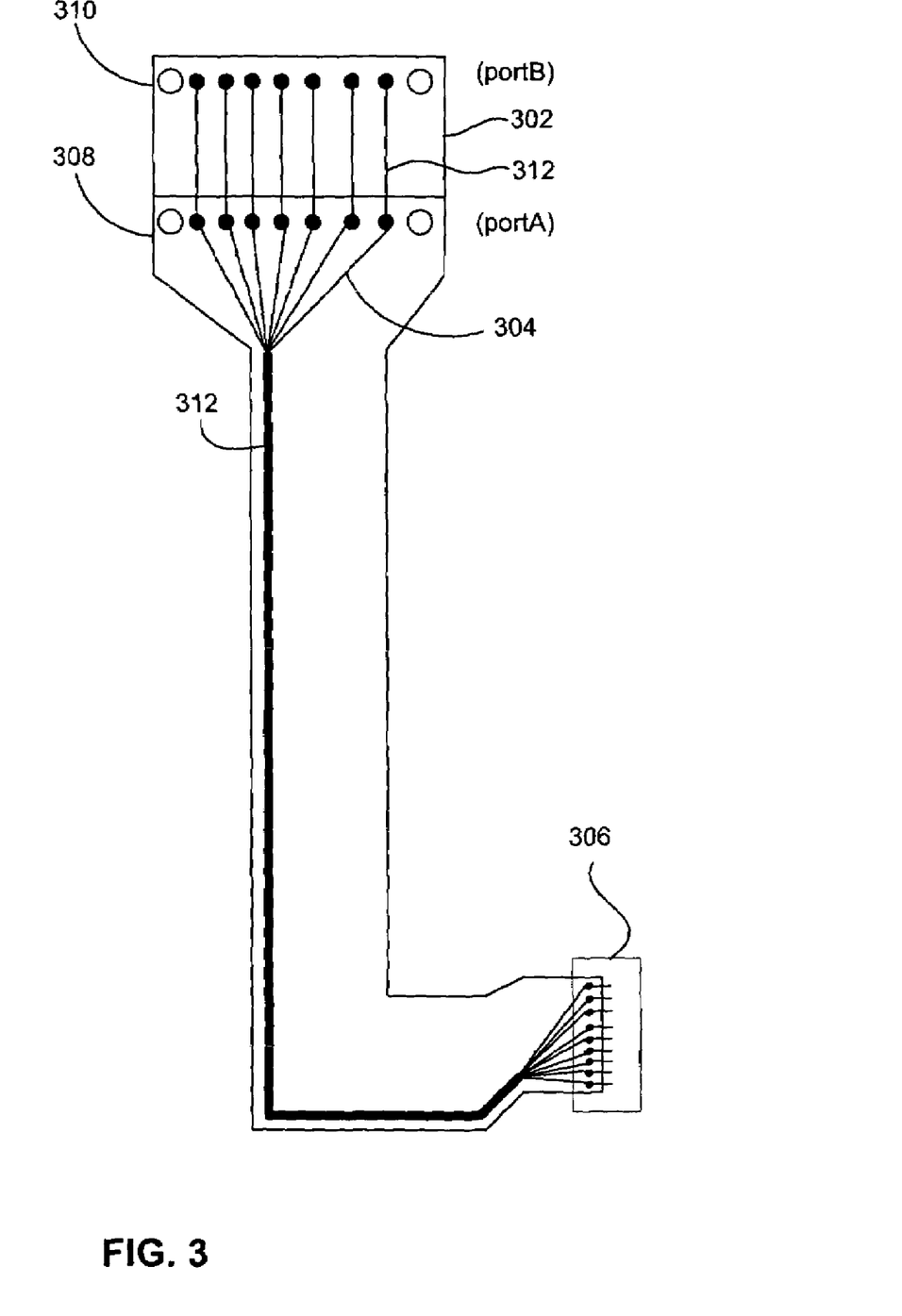
FIG. 3 is a side view of a cable having a cable extension according to one embodiment.

FIG. 3 illustrates a cable 300 having a cable extension 302 coupled thereto according to one embodiment. Particularly, the cable 300 has leads 304 which are attached to the MR sensor 306 such that there exists two external connection locations ("pads" or "ports") 308, 310. Either or each port can be connected to an external electronics device (not shown), e.g., controller, tester, end device, etc. One port, (portA) 308 can be used to make electrical connections to the external electronics device for measurement purposes. The second port (portB) 310 can then have a removable shorting connection made across the leads. The reverse is also true, in that the short can be made across portA and the external device connected to portB. Illustrative shorting devices and the manner of their use is described in detail below. The cable geometry and port location are dependent upon the application needs.

In the embodiment shown, portA is the integrally formed pad array of a standard cable. PortB is part of an extension 302 with leads 312 that are coupled to the leads 304 of the cable 300. In this case, the extension 302 is an extension of portA 308. In a preferred embodiment, portB 310 and its leads 312 are formed as part of the initial cable fabrication at very little additional cost, rather than attaching it as a separate piece at a later time as in other embodiments described below.

Figure 4:
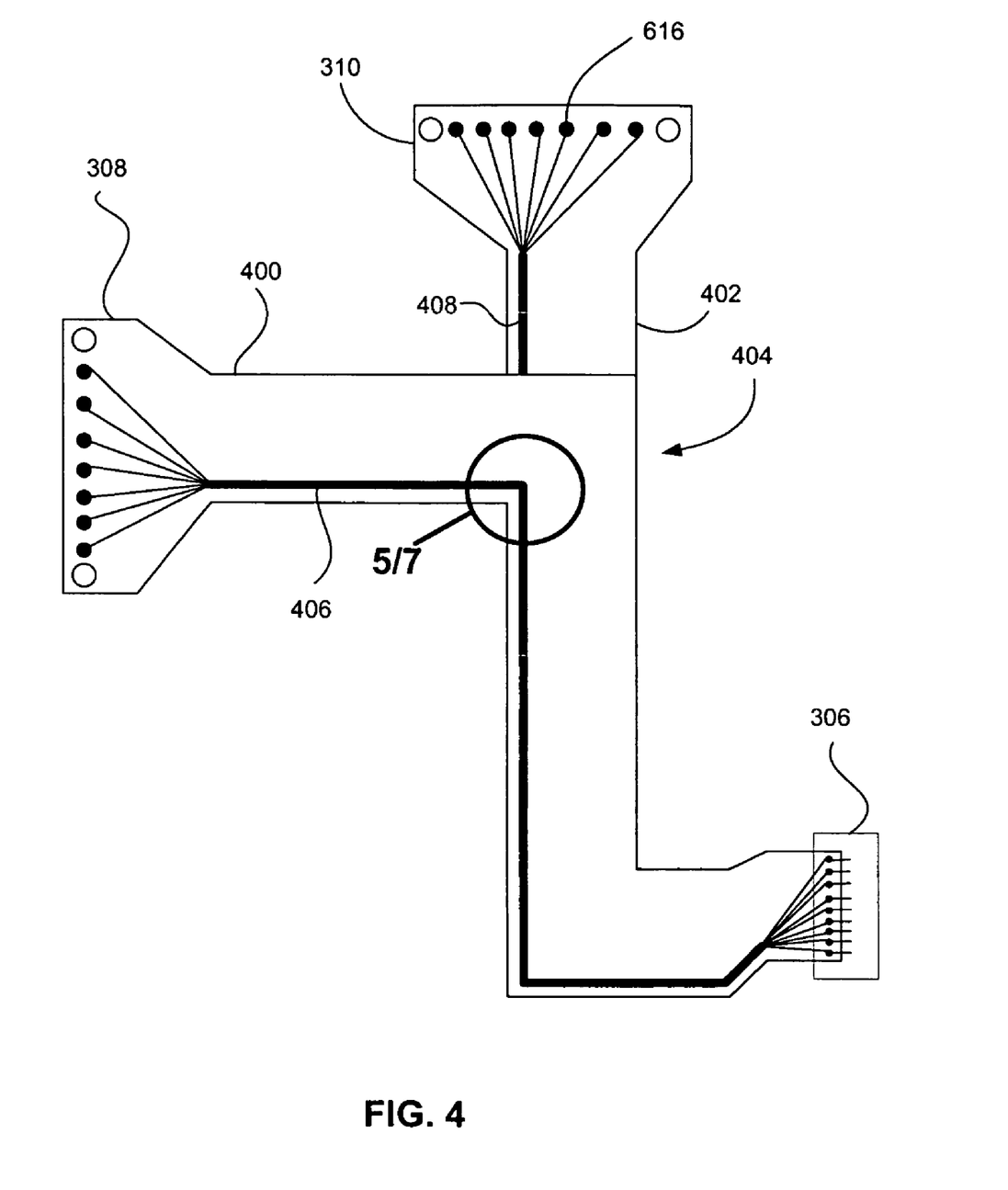
FIG. 4 is a side view of a cable having a cable extension according to another embodiment.

In another embodiment, the extension is formed as an attachment to the cable. FIG. 4 illustrates an embodiment of a cable 400, where the standard cable with portA 308 has a Z-shape and the extension 402 with portB 310 extends from a different area of the cable 400. PortB 310 is part of the extension 402 with leads 408 that are coupled to the leads 406 of the cable 400 at a point of coupling 404 via any suitable mechanism.

Figure 5:
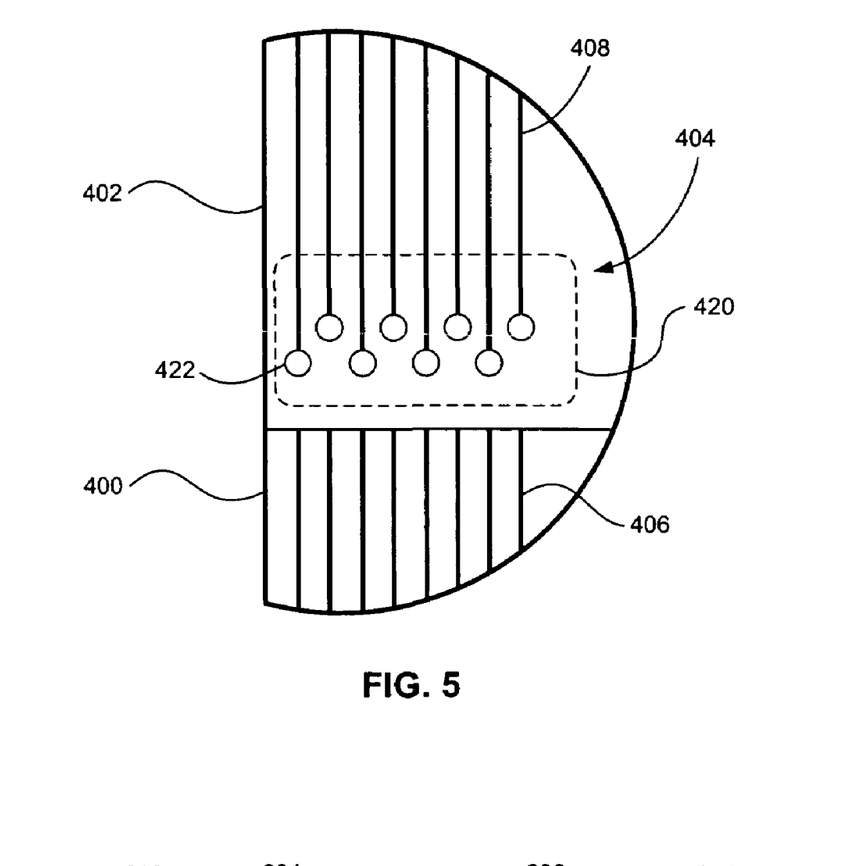
FIG. 5 is a detailed view taken from Circle 5/7 of FIG. 4.

FIG. 5 illustrates one type of coupling that can be made to couple the leads of the extension 402 to the leads of the cable 400 at the point of coupling 404. As shown in FIG. 5, lead pads (not shown) of the cable 400 are exposed in a window 420 of the cable 400 to pads 422 on the extension 402. The pads are aligned one on top of the other and connected via any suitable means. Solder bonding technology, though, has a minimum pad pitch of around 200 microns. With the large number of leads in a tape head cable 400, smaller pitches are preferable if not required. An adhesive can be added to strengthen the coupling of the extension 402 to the cable 400.

Alternatively, a compression fitting of a type known in the art can be used to physically couple the extension 402 leads to the cable 400. The compression fitting, though is far less desirable due to the added mass of the compression fitting and potential reliability concerns.

An alternative and preferred method of electrically attaching the leads of the extension 402 to the leads of the cable 400 is to use anisotropic conductive film (ACF) bonding. ACF can be used to couple the extension 402 to the cable 400, head, etc. In general, ACF includes particles of electrically conductive material embedded in a nonconductive adhesive. Thus, the ACF provides three functions: bonding, conduction in a direction perpendicular to its plane, and insulation in the plane direction.

Figure 6:
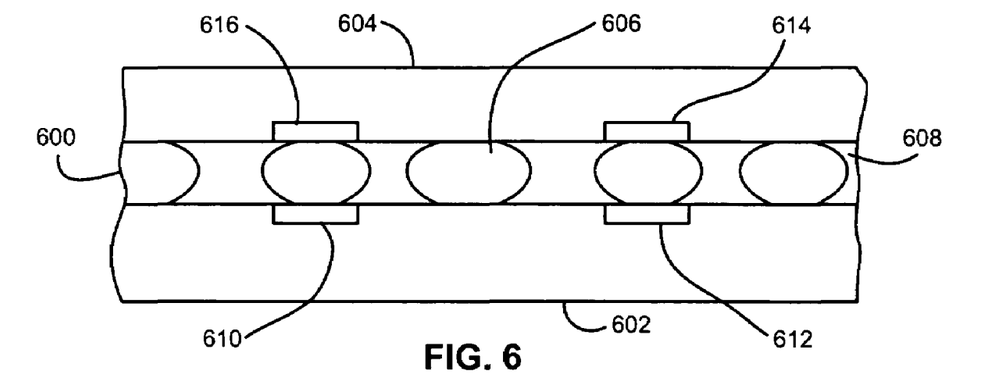
FIG. 6 is a simplified cross sectional view, not to scale, of anisotropic conductive film bonding.

As shown in FIG. 6, the ACF 600 is placed between the extension 402 and cable 400 at the point of coupling 404. The extension/ACF/cable stack is then heated and compressed. The particles 606 of electrically conductive material contact the electrically conductive surfaces (e.g., leads themselves or pads) 610, 612, 614, 616 providing an electrical connection between the vertically aligned leads (610 with 614 and 612 with 616). Because the particles are isolated in the horizontal plane by the adhesive 608, current does not flow along the horizontal plane, maintaining isolation between horizontally located pads (e.g., 614 is isolated from 612 and 616 while contacting 610). The adhesive 608 provides an additional benefit of coupling the extension 402 to the cable 400. One suitable type of ACF is CP9652KST, sold by Sony Chemical Corporation of America, 1001 Technology Drive, Mount Pleasant, Pa. 15666 USA.

ACF bonding allows electrical coupling of components with much smaller dimensions than solder bonding. With extant ACF bonding techniques for bonding the extension to the cable, the pad separation can be reduced to about 50 micron pitches, and possibly smaller. As mentioned above, the tape head actuates during use, so any addition of mass to the head affects its dynamics. Thus it is desirable to reduce the mass of the head as much mass as possible. Because the extension can be merely another cable, and can be bonded using ACF bonding, the additional mass is negligible and the dynamics of the head are virtually unaffected. Furthermore, because of the small pad pitches achievable with ACF bonding, lead-to-lead connections can be made, simplifying the cable layout and avoiding the need for additional metal layers on the cable and additional metal layers on the extension which would add substantial cost. The inventor has found ACF bonding to be inexpensive and reliable.

One skilled in the art will understand that various other types of bonding can be implemented, such as wire or stitch bonding.

Figure 7:
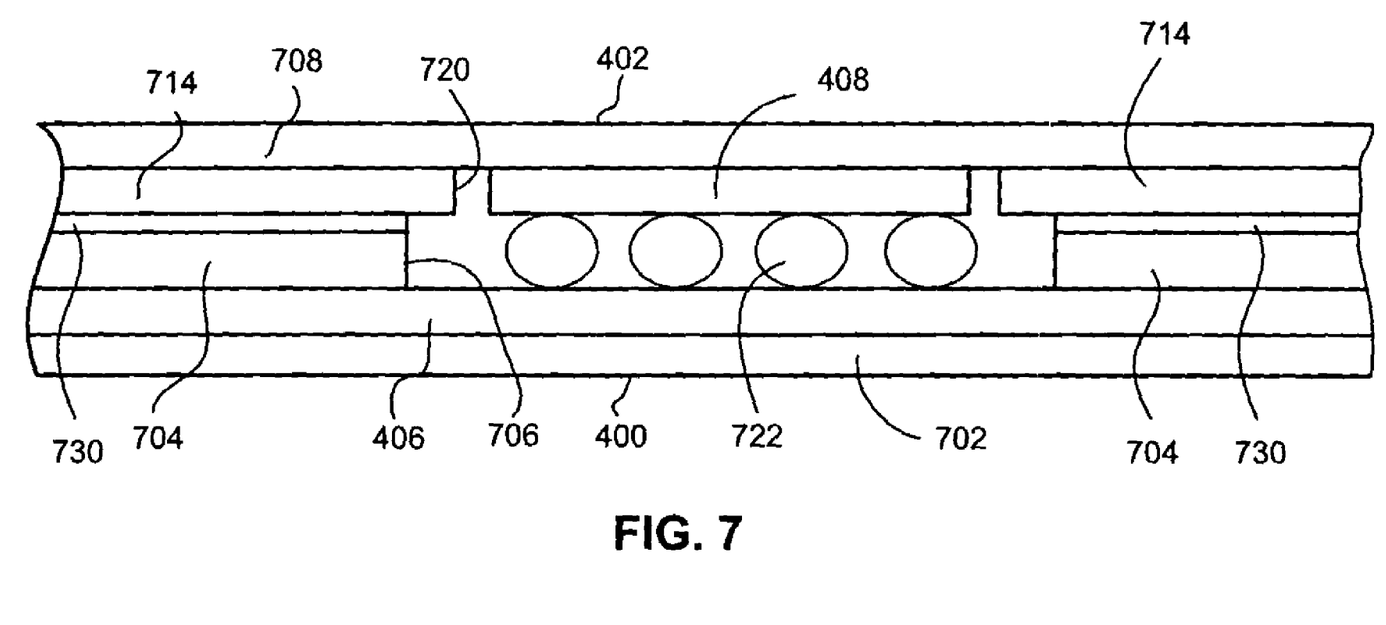
FIG. 7 is a detailed view taken from Circle 5/7 of FIG. 4.

FIG. 7 illustrates the point of coupling of the leads 406 in the cable 400 and leads 408 in the extension 402. In this embodiment, the cable 400 can be formed as a laminate of a lower insulating layer 702, leads 406 and a first intermediate insulating layer 704, the firsts intermediate insulating layer 704 having a window 706 therein. The extension 402 includes a second intermediate insulating layer 714 and an upper insulating layer 708. The second intermediate insulating layer 714 has a window 720 therein. The leads 406 of the cable 400 follow only the cable path. Leads 408 of the extension 402 are formed starting in the window 720 and extending to the pads (portB) of the extension 402. The upper insulating layer 708, formed above the leads 408 of the extension 402, can have the profile of the extension or the profile of the cable and extension. A bond material 722, e.g., solder, couples the leads 406 of the cable 400 to the leads 408 of the extension. An adhesive 730 couples the cable 400 and extension 402 together.

Figure 8:
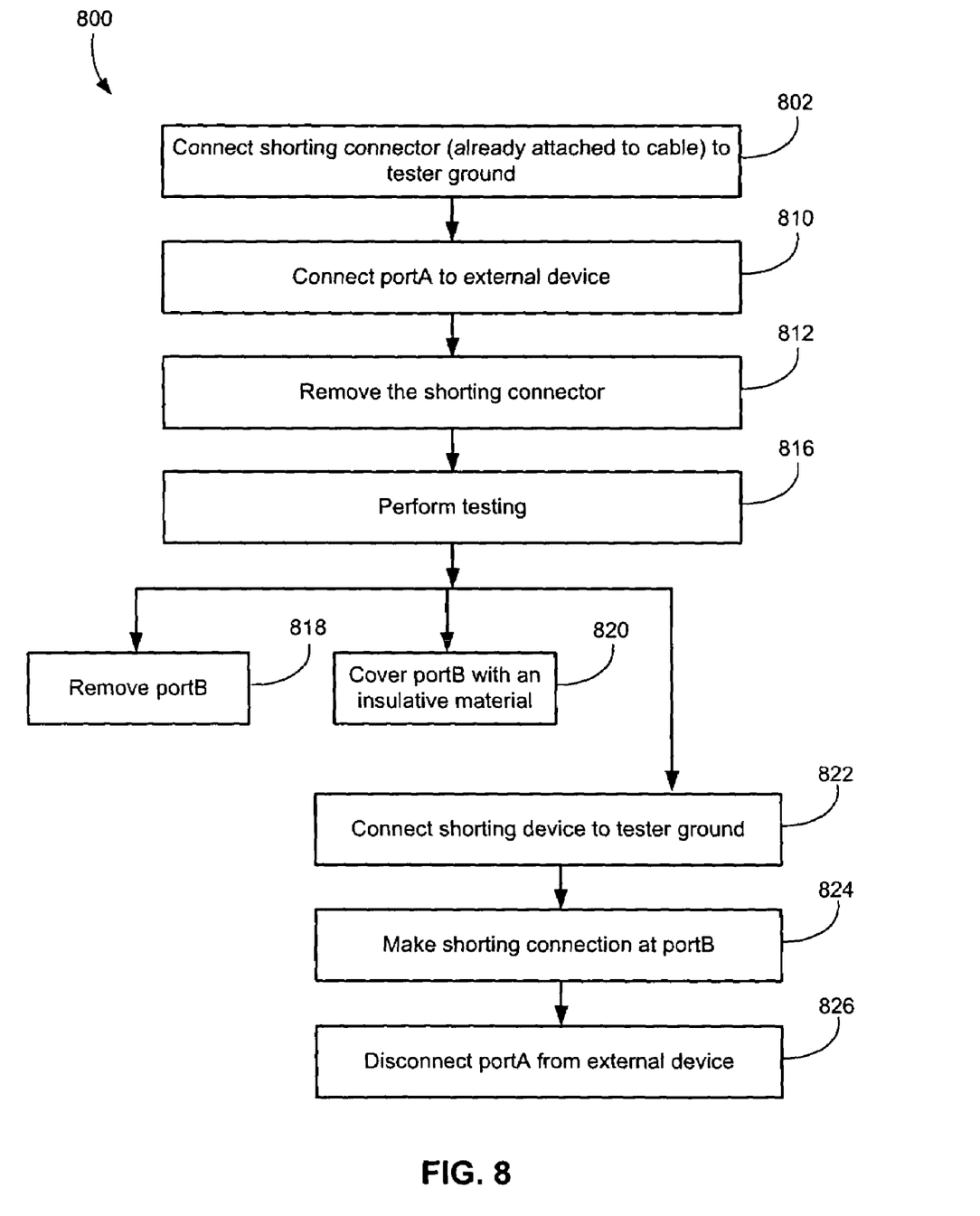
FIG. 8 is a process diagram depicting a method for using a cable and extension to protect an electronic device.

FIG. 8 depicts a method 800 for using a cable and extension to protect an electronic device, e.g., an MR head. This method assumes that the cable is already coupled to the device to be protected, and the shorting device is coupled to one of the ports. Indeed, it is desirable to make the shorting connection prior to bonding the cable to the device to be protected so that the device is protected at all times. In step 802, a shorting connection is made prior to connecting the cable leads to the MR sensor, and is maintained throughout manufacturing assembly. To discharge any voltage differential between the head sensors and the test equipment ground, the shorting device is first connected to the testing device's ground through a high impedance connector. The impedance is chosen to ensure the discharge is slow enough so as to not damage the sensors. Then, a low impedance connection is made between the shorting device and the tester ground.

When the device is to be tested or used in its final equipment (e.g., a drive), portA is connected to the external electronics device (drive or test electronics) in step 810 while the short is maintained on portB. Once portA has been electrically connected to the external device, the shorting connector can be removed in step 812 without the potential for EOS/ESD damage, since the external device should have the protection built in (e.g., diodes or resistors). These connections are to be detachable without affecting the functionality of the cable. i.e., many connections and disconnections can be made to either of the ports. With the shorting connection removed, the device can be safely tested in step 816.

In the final device (drive) portB can be removed (cut off) (step 818) or simply coated or covered with an insulating material, e.g., insulative film, clamp, etc. (step 820) which can be removed if the cabled sensors are to be later removed for use elsewhere. Removable insulation allows the user to remake the short at any time. If the device is to be processed further, it can be removed by first reconnecting the short to the tester ground in step 822, then connecting the shorting device to the pads of portB in step 824. The device can be safely detached form the external device in step 826.

The preferred shorting devices that create the shorting connection at portB can be attached and disconnected many times without impacting the reliability of the integrity of the electrical connection.

One type of shorting device includes a compression connection coupleable to portB of the extension (or portA of the cable). One such removable shorting device can be a conductive wire mesh or wire sheet which is compressed down onto the metal pads of portB with a clamping device. Another shorting device is a metal sheet, e.g., copper or nickel plated copper tape, that is clamped to portB with a clamping device. Such tape is available from 3M Corporation. The clamping device can be, for example, a plastic clamp, or can be a screw-tightened clamp.

Figure 9:
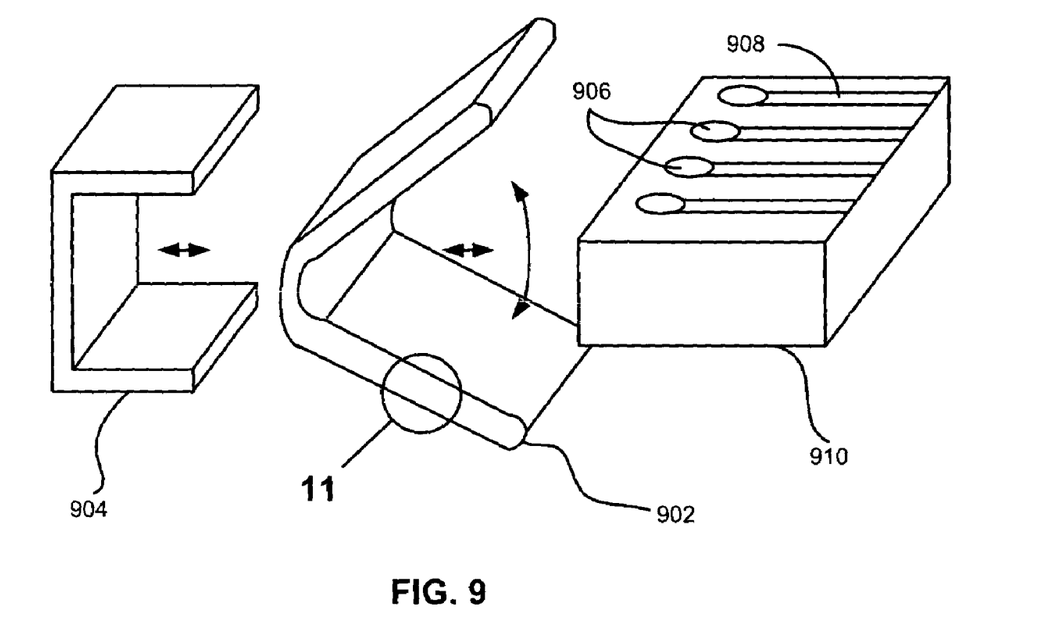
FIG. 9 is an exploded side view of a shorting device according to one embodiment.

FIG. 9 illustrates an exploded side view of a shorting device comprising a conductive shorting member 902 such as a wire mesh or conductive tape, and a clamp 904. The clamp 904 clamps the shorting member 902 to the exposed contacts 906 to the leads 908 of the extension 910 or cable for shorting the contacts 906, thus protecting the MR head from damage caused by ESD by creating an electrical path lower in resistance than the MR head. In use, the shorting member 902 and the clamp 904 are capable of being re-used with a plurality of different cables.

As shown, the shorting member 902 may include a pair of substantially rectangular planar halves each including a pair of elongated edges and a pair of short edges. Moreover, a first one of the elongated edges of a first one of the halves may be hingably coupled to a first one of the elongated edges of a second one of the halves.

As an option, the hinged coupling may include an integral coupling, and the shorting member 902 may be constructed from a substantially flexible material (i.e. elastomeric material, foam, etc. which has a coating or covering made of a conductive material). Thus, in one embodiment, the shorting member 902 includes a unitary device. Moreover, in the present embodiment, the shorting member 902 may form a substantially V-shaped cross-section along a length thereof, and be capable of moving in a clamping motion represented by the arrows illustrated in FIG. 9.

For reasons that will soon become apparent, the shorting member 902 preferably includes a conductive non-corrosive layer positioned thereon to form a conductive non-corrosive inner surface. More exemplary information regarding one possible construction of the shorting member 902 will be set forth in greater detail during reference to FIG. 11.

Moreover, the clamp 904 may be formed of a substantially rigid material (i.e. plastic, etc.). Additionally, the clamp 904 may optionally be formed of a static dissipative or conductive material. In one embodiment, the clamp 904 may include a pair of substantially rectangular planar portions separated in a fixed spaced relationship with a substantially rectangular intermediate portion. Thus, the clamp 904 forms a substantially U-shaped cross-section along a length thereof.

Figure 10:
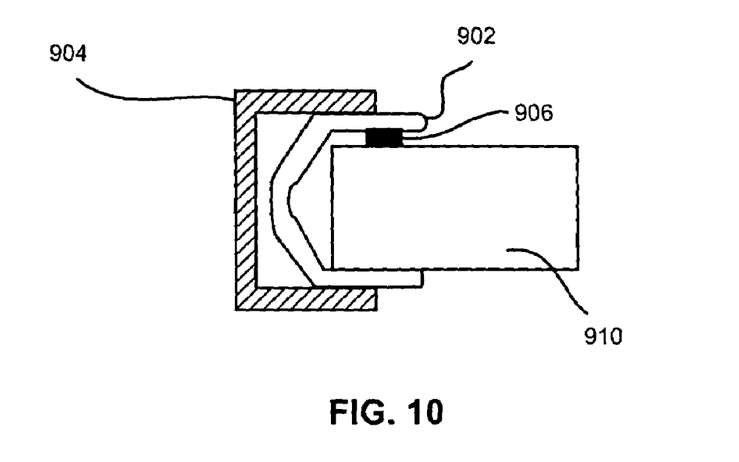
FIG. 10 is a side view of a shorting device of FIG. 9 in use.

FIG. 10 illustrates another side view of the various components of FIG. 9, shown in use. As shown, the protective member 902 is capable of being clamped such that its conductive inner surface is engaged with the contacts 906 of the extension 910 or cable.

Figure 11:
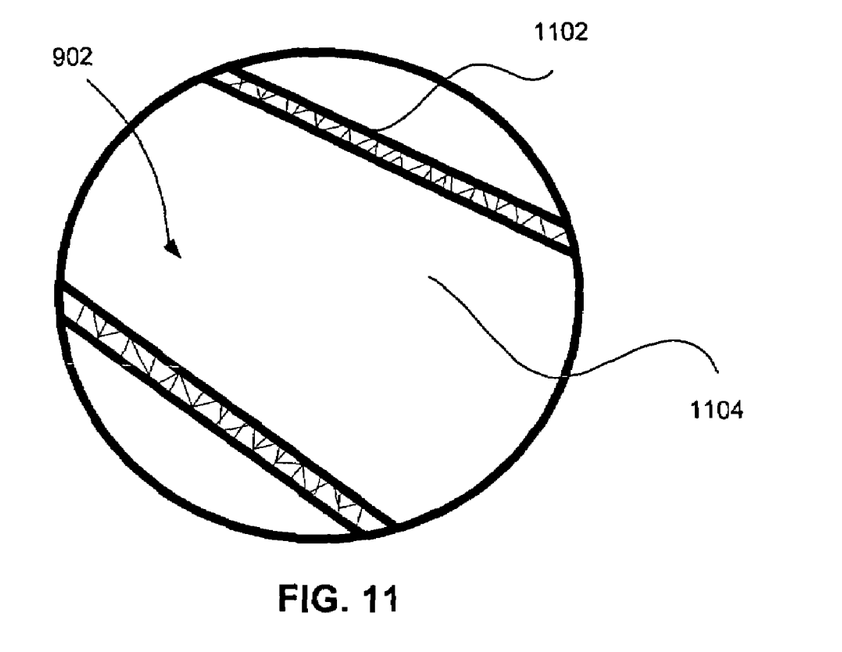
FIG. 11 is a detailed view taken from Circle 11 of FIG. 9.

FIG. 11 illustrates an enlarged side cross-sectional view of the protective member 902 encircled in area 11 shown in FIG. 9. As shown, the protective member 902 may include a conductive layer 1102 comprising a woven mesh of conductive fibers. In one embodiment, the conductive fibers may include copper or conductive stainless steel. Moreover, gold or some other non-corrosive material may be used in combination with the copper to prevent the layer 1102 from corroding. Moreover, a center core 1104 may be formed of a flexible material such as an elastomeric material, foam, etc. In one embodiment, the core 1104 may be formed of any static dissipative material or any other desired composition.

Figure 12:
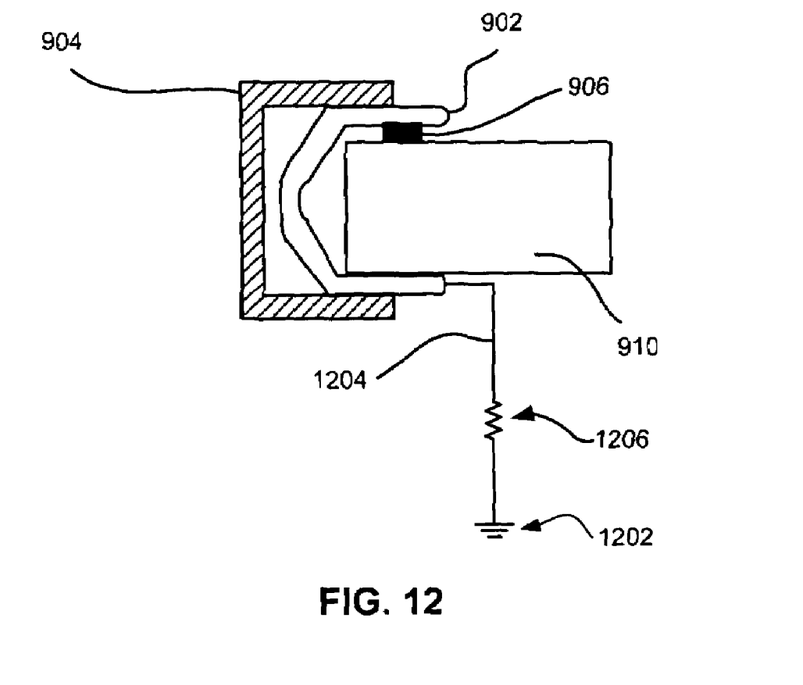
FIG. 12 is a system diagram of a grounded shorting device according to one embodiment.

As shown in FIG. 12, to enhance ESD/EOS protection, the shorting device 902 can be coupled to a ground 1202, such as the testing device ground, via a grounding means, e.g., a wire 1204 or other conductive pathway. This grounding 1204 dissipates any EOS/ESD charge brought to bear on the shorting device 1200. In dissipating any voltage differential between the sensors and leads on the device and the test measuring device, it is advisable to avoid rapid charge dissipation. Using a resistance between the devices with a sufficiently high impedance, the RC time constant can be made slow enough to avoid damage to the sensors. The wire 1204 connecting the shorting device to the ground can have a resistor 1206 having the appropriately chosen impedance for this purpose.

Note that the shorting device has been described as being coupled to portB, as this allows the cable to be coupled to the final device through portA while the short is maintained. However, it should be understood that the shorting device can be coupled to portA and testing equipment coupled to portB if desired. The closer the short is to the sensitive sensors, the more effective the protection from EOS/ESD damage.

To avoid potential EOS/ESD damage to the sensors from tribocharging when the shorting connector is made or removed, the surface of the cable and extension can be made of or covered with an electrostatic dissipative (~$10^7$ ohms/sq) material. For simplicity, the following discussion will be described in terms of providing an electrostatic dissipative material to the cable.

Figure 13:
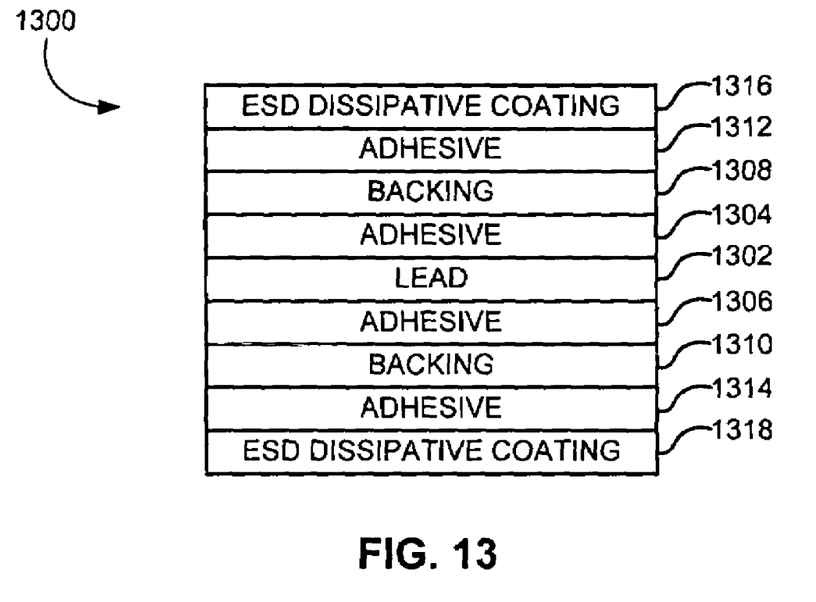
FIG. 13 is a simplified partial cross sectional view, not to scale, of a cable having ESD dissipative layers.

According to one embodiment, the outer surface of the cable is made to be ESD conductive, preferably having an ESD dissipative surface resistance in the range of about $1\times10^6$ to $1\times10^8$ ohms per square, more preferably about $0.5\times10^7$ to about $1.5\times10^7$ ohm/sq, and ideally about $1\times10^7$ ohms/sq. The bulk of the cable material can be any desired material including metal, resistive material (e.g., KAPTON), adhesives, liquid crystal, etc. For example, FIG. 13 illustrates a cross section of a cable 1300 having a lead 1302 of a metal or other conductive material, inner adhesive layers 1304, 1306 skirting the lead 1302, backing layers 1308, 1310 coupled to the inner adhesive layers 1304, 1306, outer adhesive layers 1312, 1314 skirting the backing layers 1308, 1310, and ESD dissipative layers 1316, 1318 coupled to the outer adhesive layers 1312, 1314. Note that layers can be added or removed per the desires of the user.

An ESD conductive surface on the cable in the disclosed range of conductivity will not result in electromagnetic interference (EMI), and will not noticeably electrically couple any two elements in the same cable together.

In one embodiment, an ESD dissipative coating layer is applied to one or more of the outer surfaces of a standard cable. Again, the bulk of the cable material can be any desired material. The ESD dissipative coating is sprayed, painted on with an applicator, or otherwise applied to the cable in liquid or gel form in a thin layer by any suitable mechanism. In this cable, the outer adhesive layers (1312 and 1314) in FIG. 13 may not be necessary. The thickness of the layer of ESD dissipative material should be sufficient to provide an ESD dissipative surface resistance in the range of about $1\times10^6$ to $1\times10^8$ ohms/sq. One preferred surface material is SPEC- STAT® ESD CLEAR #618-1-220 available from Lasco Services, 601 Compton, Irving, Tex. 75061. Another is SPEC-STAT® ESD CLEAR #618-1-200 from Lasco Services. Experimentation has shown that when a cable coated with SPEC-STAT® ESD CLEAR #618-1-220 is rubbed with a nitrile glove ten times, the cable does not display any significant surface charge (<10V versus >1000V if KAPTON is rubbed).

One method for applying an ESD dissipative material such as SPEC-STAT® ESD CLEAR to a cable includes the following steps. Ensure that the cable to be painted is free of dirt, grease, oils and is dry. Position the cable about 10 to 12 inches from the spray nozzle. Spray with light sweeping action. Allow to dry so that it is not tacky to the touch. Apply a second coat. To accelerate drying, heated air can be blown against the cable after each application. Note that during application, it may be desirable to mask exposed leads of the cable that will eventually be electrically coupled to a sensor or other devices.

In another embodiment, an ESD dissipative layer is bonded onto one or more of the surfaces of the cable. Particularly, a thin ESD dissipative polymer coating can be bonded to the surfaces of the cable. A preferred surface material is a thin polymer which has conductive materials interspersed to make the polymer sheet resistance in the range set forth above. One such material is KAPTON® XC polyimide film sold by DuPont. DuPont KAPTON® XC polyimide films are electrically conductive films, which are precisely loaded with conductive carbons to produce films with tightly controlled surface resistivities. The resistive property is throughout the bulk of the film, so it cannot be cracked, rubbed off or otherwise easily damaged, as is often the case with surface coatings or metalizations. In addition to anti-static properties, KAPTON® XC film provides inertness, radiation and temperature resistance similar to that of other KAPTON® films such as those typically used to construct cables. Experimentation has shown that when a cable coated with KAPTON® XC film is rubbed with a nitrile glove ten times, the cable does not display any significant surface charge (<10V versus >1000V if standard KAPTON material is rubbed).

KAPTON® 100XC10E7 is a one mil film with a nominal surface resistivity of $10^7$ ohm/sq. Custom constructions are also available from DuPont, and can be produced in thickness from 1 to 5 mil, and with surface resistances from 20 to $10^9$ ohms/sq. KAPTON® 100XC10E7 film is supplied in rolls.

The ESD dissipative coating can be bonded to the cable by any suitable mechanism, including application of an appropriate adhesive such as heat-activated PYRALUX® sold by DuPont. Alternatively, the ESD dissipative coating can have an adhesive backing already formed thereon.

Figure 14:
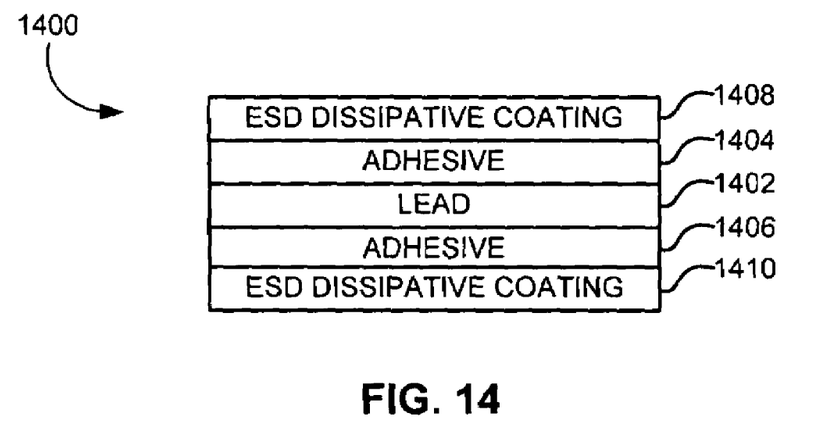
FIG. 14 is a simplified partial cross sectional view, not to scale, of a cable having ESD dissipative layers that act both as the cable substrate and lead insulators.

In a further embodiment, an ESD dissipative coating is used as the insulator for the cable. Preferably, the ESD dissipative coating will have an electrical resistivity that is sufficient to prevent shorting of the conductors and leads in the cable, as well as not significantly interfere with the signal being sent through the cable. FIG. 14 illustrates a cross section of a cable 1400 having a lead 1402 of a metal or other conductive material, adhesive layers 1404, 1406 skirting the lead 1402, and ESD dissipative layers 1408, 1410 coupled to the adhesive layers 1404, 1406. Note that additional layers can also be present.

Table 1 lists results of experiments measuring the tribocharging potential of various sheet materials. In the "rubbed with nitrile gloves" experiments, a clean sheet of the material was rubbed with nitrile gloves ten times with one inch strokes. In the "peeling off from paper" experiments, a paper backing was peeled off of the material.

TABLE 1

| Material | Rubbed with Nitrile glove Voltage (Volts) | Peeling off from paper Voltage (Volts) |
|---|---|---|
| Kapton XC $10^7$ ohm/sq | Insignificant | Insignificant |
| Kapton CPB $10^{12}$ ohm/sq | 50-400 | >3000 |
| LCP 3600 F02053 | 200-3000 | >3000 |
| Kapton/Pyralux, LF7001 Dupont | >1000 | >3000 |
| LCP 3800 | >1500 | >3000 |
| LCP 212141 | >1000 | >3000 |

Expanding on the results shown in Table 1, rubbing a cable (KAPTON CBP (polyimide) cleaned with isopropyl alcohol) with nitrile gloves charges the cable to over 250±100V. Rubbing clean polyimide with wire mesh suitable for shorting leads results in a tribocharging voltage of 800±400V. Rubbing the KAPTON XC ($10^7$ Ω/sq) with the same wire mesh results in insignificant tribocharging.

Rubbing a clean sheet (Kapton LF7001 (polyimide)) with a finger or nitrile gloves charges the cable to over 1600V. Charge dissipation times are: 11, 102 and 450 seconds for 75%, 50%, 90% dissipation, respectively. The external voltage from the charged surface is dramatically shielded when the KAPTON sheet is placed over a metal (aluminum foil) but the external voltage "reappears" when the metal sheet is removed, indicating that the metal sheet insulated the charges on the KAPTON from external detection without removing the charges, thus hiding the potentially damaging charges from detection. The voltage with height drops by ~3.4% per mm.

Rubbing a clean cable (Kapton XC (polyimide with a small percentage of conductive graphite, $10^7$ Ω/sq)) with nitrile gloves results in no noticeable tribocharging, even when holding with an insulator.

The cables and extensions thus described with an ESD dissipative coating are effectively immune to charge build up and thus eliminate this mechanism as a source of ESD or EOS damage. The cables described herein are suitable for use with any device or electronic component for which ESD or EOS protection is desired. The cables are especially useful when coupled to MR sensors in magnetic storage devices such as tape drives and disk drives.

The embodiments thus described do not significantly affect the cable mechanical properties such as bending stiffness or weight, making them preferable to other ESD and EOS prevention devices whose weight can interfere with actuation of the tape or disk heads.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device for protecting an electronic device from electrostatic discharge (ESD), comprising:
   a cable having leads coupled to an electronic device and a first port providing access to the leads;
   an extension having leads electrically coupled to the leads of the cable and a second port providing access to the leads of the extension; and wherein a shorting device is coupleable to one of the ports for creating a short between both the leads of the extension and the leads of the cable, wherein the leads of the extension are physically coupled to the leads of the cable by a compression fitting.

2. A device for protecting an electronic device from electrostatic discharge (ESD), comprising:

a cable having leads coupled to an electronic device and a first port providing access to the leads;

an extension having leads electrically coupled to the leads of the cable and a second port providing access to the leads of the extension; and wherein a shorting device is coupleable to one of the ports for creating a short between both the leads of the extension and the leads of the cable, wherein the leads of the extension are coupled to the leads of the cable with an anisotropic conductive film (ACF).

3. A device as recited in claim 2, wherein the extension is an integral part of the cable.

4. A device as recited in claim 3, wherein the extension extends directly from the first port of the cable.

5. A device as recited in claim 2 wherein the shorting device is detachably coupleable to one of the ports.

6. A device as recited in claim 2, wherein an outer surface of the cable and the extension includes an electrostatic dissipative material.

7. A device as recited in claim 2, wherein the electronic device includes magnetoresistive elements.

8. A device for protecting an electronic device from electrostatic discharge (ESD), comprising:

a cable having leads coupled to an electronic device and a first port providing access to the leads;

an extension having leads electrically coupled to the leads of the cable and a second port providing access to the leads of the extension; and wherein a shorting device is coupleable to one of the ports for creating a short between both the leads of the extension and the leads of the cable, wherein the shorting device includes a wire mesh or metal sheet.

9. A device for protecting an electronic device from electrostatic discharge (ESD), comprising:

a cable having leads coupled to an electronic device and a first port providing access to the leads;

an extension having leads electrically coupled to the leads of the cable and a second port providing access to the leads of the extension;

wherein a shorting device is coupleable to one of the ports for creating a short between both the leads of the extension and the leads of the cable; and a grounding means for electrically grounding the shorting device, wherein the grounding means includes a resistor having a higher impedance than the shorting device.

10. A device as recited in claim 9, wherein the leads of the extension are solder bonded to the leads of the cable.

11. A device for protecting a magnetoresistive head from electrostatic discharge (ESD), comprising:

a cable having leads coupled to an electronic device and a first port providing access to the leads;

an extension having leads electrically coupled to the leads of the cable and a second port providing access to the leads of the extension; and wherein a shorting device is detachably coupleable to one of the ports for creating a short between both the leads of the extension and the leads of the cable, wherein the leads of the extension are physically coupled to the leads of the cable by a compression fitting.

12. A device for protecting a magnetoresistive head from electrostatic discharge (ESD), comprising:

a cable having leads coupled to an electronic device and a first port providing access to the leads;

an extension having leads electrically coupled to the leads of the cable and a second port providing access to the leads of the extension; and wherein a shorting device is detachably coupleable to one of the ports for creating a short between both the leads of the extension and the leads of the cable, wherein the leads of the extension are coupled to the leads of the cable with an anisotropic conductive film (ACF).

13. A device as recited in claim 12, wherein the extension is an integral part of the cable.

14. A device as recited in claim 12, wherein an outer surface of the cable and the extension includes an electrostatic dissipative material.

15. A device for protecting a magnetoresistive head from electrostatic discharge (ESD), comprising:

a cable having leads coupled to an electronic device and a first port providing access to the leads;

an extension having leads electrically coupled to the leads of the cable and a second port providing access to the leads of the extension; and wherein a shorting device is detachably coupleable to one of the ports for creating a short between both the leads of the extension and the leads of the cable, wherein the shorting device includes a wire mesh or metal sheet.

16. A device for protecting a magnetoresistive head from electrostatic discharge (ESD), comprising:

a cable having leads coupled to an electronic device and a first port providing access to the leads;

an extension having leads electrically coupled to the leads of the cable and a second port providing access to the leads of the extension; and wherein a shorting device is detachably coupleable to one of the ports for creating a short between both the leads of the extension and the leads of the cable, a grounding means for electrically grounding the shorting device, wherein the grounding means includes a resistor having a higher impedance than the shorting device.

17. A device as recited in claim 16, wherein the leads of the extension are solder bonded to the leads of the cable.

18. A method for protecting an electronic device from electrostatic discharge (ESD), a cable being coupled to the electronic device, the cable having a first ports providing access to leads thereof, an extension having leads electrically coupled to the leads of the cable and a second port providing access to the leads of the extension, the method comprising:

coupling a shorting device to one of the ports thereby creating a short between both the leads of the extension and the leads of the cable;

electrically grounding the shorting device, wherein the grounding includes a resistor having a higher impedance than the shorting device;

coupling an external device to another of the ports; and removing the shorting device.

19. A method as recited in claim 18, further comprising physically removing the port not attached to the external device.

20. A method as recited in claim 18, further comprising covering the port not attached to the external device with an insulating material.

21. A method as recited in claim 18, wherein the shorting device is detachably coupleable to one of the ports.

22. A method as recited in claim 18, wherein an outer surface of the cable and the extension includes an electrostatic dissipative material.

23. A method as recited in claim 18, wherein the external device is a testing device.

24. A method as recited in claim 18, wherein the external device is an end user device.

* * * * *